Sept. 22, 1936. A. J. FAUSEK ET AL 2,054,972
ELECTRODE HOLDER
Filed July 30, 1934
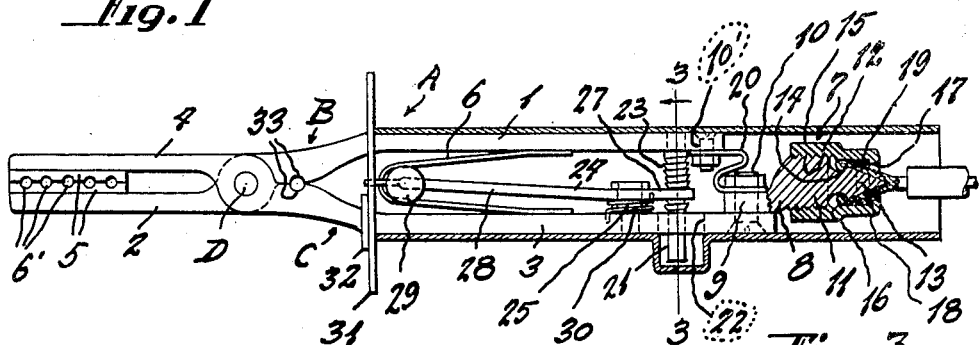
Fig. 1
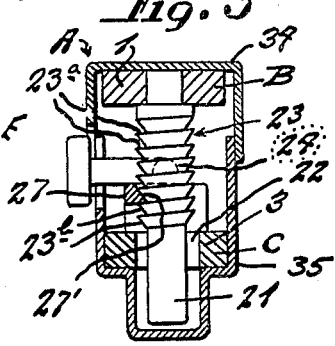
Fig. 2  Fig. 3
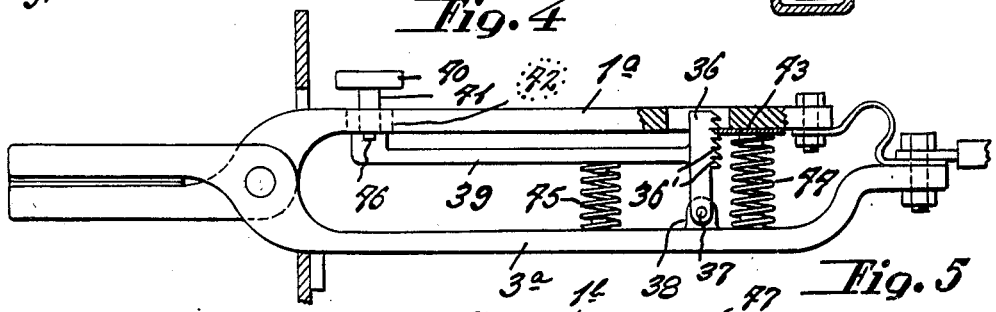
Fig. 4
Fig. 6  Fig. 5
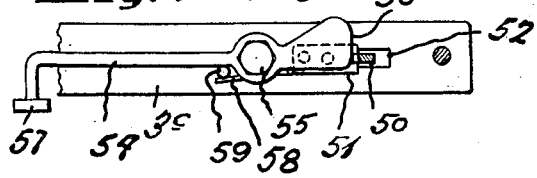
Fig. 7
Inventors—
A. J. Fausek and
I. F. Fausek,
By E. M. Harrington,
ATTORNEY Patented Sept. 22, 1936

2,054,972

UNITED STATES PATENT OFFICE 2,054,972

ELECTRODE HOLDER

Arthur J. Fausek and Irwing F. Fausek, Clayton, Mo.

Application July 30, 1934, Serial No. 737,516

4 Claims. (Cl. 219—8)

This invention relates generally to electrode holders, and more specifically to electrode holders of the type employed in performing electrical welding operations, the predominant object of the invention being to provide an electrode holder which is so constructed and arranged that in use it resembles a pliers, in that the electrode-gripping action is obtained by squeezing together a pair of handle portions which causes the jaws of the electrode holder to move toward each other and grip the electrode. This arrangement differs from the construction of electrode holders heretofore used in accordance with which the gripping action was obtained through the action of springs which forced the handle portions apart to close the jaws, and the jaws were separated by squeezing the handle portions together against the action of the springs.

An extremely important feature of the invention is the unique and convenienly operated means for locking the jaws of the electrode holder in a closed condition, thus eliminating the necessity for an operator who is using the electrode holder to continuously apply pressure to the handles of the electrode holder in order to cause the jaws to grip the electrode. In the use of the improved electrode holder disclosed herein, the electrode is arranged between the separated jaws and the handle portions are squeezed together to cause the jaws to grip the electrode. The locking means referred to locks the handle portions when they have been squeezed together and the electrode is tightly held by the locked jaws until the locking means is released. Thus, when an electrode has been locked in place between the jaws of the improved electrode holder, a rigid electrode-gripping structure is provided which may be freely handled in performing the welding operations without danger that the electrode might be accidentally displaced.

Fig. 1 is a side elevation of the improved electrode holder, the cable coupling means at the rear of the holder being shown in section.

Fig. 2 is a fragmentary plan view of the electrode holder illustrated in Fig. 1, a portion of the uppermost handle portion being broken away and a portion of the shield being shown in section.

Fig. 3 is an enlarged cross-section taken on line 3—3 of Fig. 1.

Fig. 4 is a view, partly in side elevation and partly in longitudinal section, of another form of the invention.

Fig. 5 is a fragmentary longitudinal section of another form of the invention.

Fig. 6 is a fragmentary side elevation of still another form of the invention.

Fig. 7 is a horizontal section taken on the line 7—7 of Fig. 6.

In the drawing, wherein are shown for the purpose of illustration, merely, several embodiments of the invention, and referring for the present to Figs. 1, 2, and 3, A designates the improved electrode holder generally. The electrode holder A comprises a pair of holder members B and C, which are pivotally connected together by the pivot D. The holder member B includes a handle portion 1 and a jaw portion 2, while the holder member C includes a handle portion 3 and a jaw portion 4. As will be seen by referring to Fig. 1, the holder members B and C cross each other at the pivot D, the handle portion 1 of the member B being located above the handle portion 3 of the member C, while the jaw portion 2 of the member B is located below the jaw portion 4 of the member C. Because of this arrangement it is obvious that when the handle portions 1 and 3 of the holder members B and C are squeezed together the jaws 2 and 4 of said members will move toward each other. Likewise, when the handle portions 1 and 3 move away from each other, the jaws 2 and 4 will also move away from each other. The jaws 2 and 4 are provided with electrode-gripping elements 5 which are provided with grooves 6' which facilitate the gripping of the electrodes thereby.

A leaf spring 6 is interposed between the handle portions 1 and 3 of the members B and C, as shown in Fig. 1, in such manner that said leaf spring tends to move said handle portions away from each other. This leaf spring is of more or less U-shaped formation with its leg portions contacting with the inner faces of the handle portions of the members B and C. Preferably at least one of the legs of the spring is welded or otherwise secured to one of the handle portions 1 or 3, so that the leaf spring may not be accidentally displaced from the electrode holder.

Secured to the rear end of the handle portion 3 is a cable coupler 7, by means of which the electrical conductor E for conducting electrical energy to the electrode holder is attached to said electrode holder. The coupler 7 includes a member 8 which is provided with a flattened portion 9 having an opening through which a bolt 10 is passed. The bolt 10 passes also through a similar opening formed through the handle portion 3, and in this manner the member 8 is rigidly fixed to the handle portion 3. The member 8 is provided with a portion 11 provided with external screw-threads 12, and a tapered head portion 13 which is extended rearwardly and is joined to the portion 11 by a reduced neck 14. Associated with the member 8 is a sleeve 15 which is provided with internal screw-threads 16 that engage the screw-threads 12 formed on the portion 11 of the member 8. The portion of the sleeve 15 located rearwardly of the internally screw-threaded portion thereof is provided with an inwardly extended portion 17 at the rear end of the sleeve, and at the forward end of this inwardly extended portion a shoulder 18 is provided. The shoulder 18 receives in contact therewith a ring 19, as shown in Fig. 1.

In attaching an electrical conductor to the electrode holder the insulation is stripped from an end portion of the conductor, as shown in Fig. 1, and the metallic strands of the conductor are forced over the tapered head 13 of the member 8 so that said strands entirely surround said tapered head. Also the tapered head is caused to penetrate the group of metallic strands of the conductor to such distance that the end portions of said metallic strands extend into the depression at the reduced neck 14 of the member 8. The sleeve 15, which during passage of the metallic strands of the conductor over the tapered head 13 surrounds the conductor at a point rearwardly of the end being attached to the coupler, is moved forwardly and is screwed on the screw-threaded portion 11 of the member 8, and during such forward movement of the sleeve the ring 19 contacts with the metallic strands of the conductor and forces said strands through a wedging action into close contact with the face of the tapered head 13, so as to cause said metallic strands to be clamped between the ring 19 and the face of the tapered head 13. In this manner the conductor is securely attached to the electrode holder so as to prevent accidental disconnection thereof and provide the necessary efficient electrical connection between the electrical conductor and the electrode holder. The ring 19 is removable from the sleeve 15 so that rings of different thicknesses may be employed with electrical conductors of different diameters.

As already stated herein, the coupler 7 is attached to the holder member C, and in order to electrically connect the holder member B to said coupler we employ a flexible connector 20. This flexible connector is attached at one of its ends to the flattened portion 9 of the member 8 of the coupler by the bolt 10 already mentioned herein, and at its opposite end the flexible connector is secured by a bolt 10' to the rear end portion of the holder member B. The flexible connector is of sufficient length and flexibility to permit free movement of the handle portions 1 and 3 from and toward each other without hindrance therefrom.

Rigidly fixed to the holder member B adjacent to the rear end of the handle portion 1 thereof is a locking element 21. This locking element is round in cross-section and it is extended through an opening 22 formed through the handle portion 3 of the holder member C. The locking element 21 is provided with spirally formed teeth 23 on its circumferential face, these teeth having substantially flat upper faces 23$^a$ and inclined side faces 23$^b$. Due to the fact that the teeth are of spiral formation they may be cut with a suitable cutting device in somewhat the manner that screw-threads are cut.

Pivotally attached to the holder member C is a locking lever 24, said locking lever having a hub portion 25 through which passes a pivot bolt 26 that is seated in an opening formed in the holder member C. The locking lever 24 includes a portion 27 which contacts with the locking element 21 and engages the teeth thereof, said lever portion 27 having an inclined face 27' that corresponds to the inclined faces 23$^b$ of the teeth on the locking element. Extended in the opposite direction from the hub portion 25 the locking lever includes a long lever portion 28 which is provided with an operating button 29 at its outer end. The locking lever 24 includes also a torsional coil spring 30 which is wound about the hub portion 25 thereof, the opposite ends of said torsional coil spring being attached respectively to the locking lever 24 and the holder member C, so that said spring tends to maintain the lever portion 27 in contact with the toothed portion of the locking element 21. It is obvious that when force is applied to the button 29 to move the long lever portion 28 of the locking lever inwardly the force exerted by the torsional coil spring will be overcome and the short lever portion 27 will be moved away from the locking element so as to disengage said short lever portion from the teeth 23.

The electrode holder A includes a shield 31 which is fixed to a support 32 carried by the holder member C. This shield is formed of fiber or other suitable material, and serves to protect the hand of a user of the electrode holder from the heat generated when welding operations are being performed with the aid of the holder. Also, the holder members are provided with co-acting depressions 33 into which electrodes may be inserted when it is desired to crack off the hard protective coating from the electrodes preparatory to use thereof. By inserting the electrodes into the co-acting depressions and operating the handle portions of the holder to repeatedly pinch the electrode between the walls of the depressions, the hard protective coating may be broken off. If desired the walls of the depressions may be toothed or otherwise roughened so as to facilitate the breaking off of the hard protective coating from the electrodes.

In the use of the improved electrode holder, the electrode is introduced between the separated jaws 2 and 4, after which the handle portions 1 and 3 are squeezed together against the action of the spring 6. During movement of the handle portions 1 and 3 toward each other, the inclined face 27' of the short lever portion 27 slides inactively over the inclined faces of the teeth 23 of the locking element. As the handle portions 1 and 3 are moved toward each other as described, the jaws 2 and 4 will also move toward each other to grip the electrode, and when the electrode has been firmly gripped between the jaws the inward movement of the handle portions will stop with the short lever portion of the locking lever in engagement with the flat top face of one of the teeth 23 of the locking element 21. This will hold the jaws in their electrode-gripping position and the electrode holder may be freely used without necessitating that the operator apply inward pressure on the handle portions to maintain the gripping action of the jaws. When it is desired to open the jaws it is necessary merely to apply force to the button 29 to move the long lever portion of the locking lever inwardly, whereby the short lever portion will be disengaged from the teeth of the locking element 21 and the spring 6 is permitted to force the handle portions apart to open the jaws.

The improved electrode holder includes insulating means for protecting a user of the holder from electrical shock. This insulating means comprises a pair of substantially U-shaped members 34 and 35, formed of fiber or other suitable electrical insulating material, which are secured to the handle portions of the holder members B and C. The leg portions of these U-shaped insulating members overlap each other, as shown in Fig. 3, so that they entirely enclose the metallic parts of the handle of the holder and are capable of relative movement as the handle portions 1 and 3 are moved toward and away from each other. The insulating members 34 and 35 extend from the shield 31 rearwardly to a point beyond the cable coupler 7. Also, the operating button, the support of which extends through openings formed in the insulating members, is formed of fiber or other suitable electrical insulating material.

In the form of the invention illustrated in Fig. 4 a slightly different means for locking the jaws in a closed condition is shown. This means includes a toothed locking element 36 which is pivoted at 37 to ears 38 formed on the handle portion 3ᵃ of the electrode holder. The toothed locking element has a long arm 39 fixedly associated therewith, this arm extending forwardly of the electrode holder and being provided at its forward end with an operating button 40, the supporting element 41 of which passes through an opening 42 formed through the handle portion 1ᵃ of the electrode holder. The teeth 36' of the locking element 36 are adapted for engagement with a plate 43 which is fixed to the handle portion 1ᵃ, and a coil spring 44 is arranged between the handle portions 1ᵃ and 3ᵃ in such manner that it tends to force said handle portions apart. Also a coil spring 45 is interposed between the long arm 39 and the handle portion 3ᵃ, this coil spring tending to force the forward end of the long arm toward the handle portion 1ᵃ. The long arm 39 is provided with a projection 46 at its forward end which is adapted to contact with the portion of the handle portion 1ᵃ adjacent to the opening 42 formed therethrough so as to limit movement of the forward portion of the long arm in a direction toward the handle portion 1ᵃ.

In the use of the electrode holder shown in Fig. 4 the teeth 36' of the toothed locking element 36 are engaged by the plate 43 when the handle portions 1ᵃ and 3ᵃ are squeezed together to move the jaws to the electrode-gripping position, whereby the handles and jaws are locked in the positions to which they have been moved. When it is desired to release the handle portions from their locked positions, the operating button is depressed, thereby withdrawing the teeth 36' from the plate 43 and permitting the coil spring to force the handle portions apart.

The form of the invention shown in Fig. 5 is substantially the same as that shown in Fig. 4, with the exception that a separate operating lever 47 is associated therewith. This operating lever is pivoted at 48 to the handle portion 3ᵇ, and an adjusting screw 49, which passes through a screw-threaded opening formed through the handle portion 1ᵇ, contacts with the operating lever 47. By manipulating the adjusting screw 49 the jaw associated with the handle portion 1ᵇ may be moved away from the jaw associated with the handle portion 3ᵇ, whereby the operation of the electrode holder is rendered easier, inasmuch as it would not be necessary to move the jaws apart against the action of the coil spring 44' as great a distance as would be necessary if the adjusting screw were not employed.

In the form of the invention illustrated in Figs. 6 and 7 the handle portion 1ᶜ has pivoted to it at 37' a toothed locking element 50, the teeth of which engage the edge of a plate 51 secured to the handle portion 3ᶜ. The toothed locking element 50 is extended through an opening 52 formed through the handle portion 3ᶜ, and a torsional spring 53 is arranged about the pivot 37' of said toothed locking element in a manner to force the toothed edge of the locking element in contact with the edge of the plate 51. The structure disclosed in Figs. 6 and 7 includes also a long lever 54 which is pivoted at 55 to the handle portion 3ᶜ, one end of said lever being provided with a cam face 56 which contacts with the toothed edge of the locking element 50 and the opposite end thereof having an operating button 57 associated therewith. The long lever 54 is provided with a torsional coil spring 58 which is arranged about its pivotal point and tends to maintain the long lever in contact with the stop 59.

When the handle portions of the structure illustrated in Figs. 6 and 7 are forced together to cause the jaws (not shown) to grip an electrode, one of the teeth of the locking element 50 will engage the plate 51 to lock the handle portions in the positions to which they have been moved. When it is desired to permit the handle portions to move apart to separate the jaws, the long lever is moved by applying inward pressure against the operating button 57. This will cause the cam face 56 to move the pivoted locking element away from the plate 51 so as to free the teeth thereof from said plate, whereupon the spring 60 will move the handle portions apart.

For the sake of simplicity of illustration, we have not shown the insulating means in Figs. 4, 5, 6, and 7, which permit free handling of the structures without danger that the operators might receive electrical shocks. It is to be understood that each of the different structures illustrated by these views would be provided with suitable insulating means, which could be applied thereto in various ways which would be perfectly obvious to one skilled in the art to which the invention relates.

We claim:

1. An electrode holder comprising a pair of associated holder members provided with handle portions and co-operating jaw portions, a pivot which passes through both of said holder members for pivoting said holder members together, said holder members crossing each other so that movement of said handle portions toward each other will cause said jaws to move toward each other, and means for locking said holder members relative to each other, said means including a long arm disposed between said handle portions and adapted for movement to unlock said locking means when it is desired to release the locked holder members.

2. An electrode holder comprising a pair of associated holder members provided with handle portions and co-operating jaw portions, a pivot which passes through both of said holder members for pivoting said holder members together, said holder members crossing each other so that movement of said handle portions toward each other will cause said jaws to move toward each other, and means including a toothed locking element for locking said holder members relative to each other, said means including a long arm disposed between said handle portions and adapted for movement to unlock said locking means when it is desired to release the locked holder members.

3. An electrode holder comprising a pair of associated holder members provided with handle portions and co-operating jaw portions, a pivot which passes through both of said holder members for pivoting said holder members together, said holder members crossing each other so that movement of said handle portions toward each other will cause said jaws to move toward each other, and means for locking said holder members relative to each other, said means comprising a toothed element movable with one of said holder members, a locking element movable with the other of said holder members which is adapted to engage the teeth of said toothed element, and a long arm located between said handle portions for disconnecting the teeth of said toothed element and said locking element when it is desired to unlock the locked holder members.

4. An electrode holder comprising a pair of associated holder members provided with handle portions and co-operating jaw portions, a pivot which passes through both of said holder members for pivoting said holder members together, said holder members crossing each other so that movement of said handle portions toward each other will cause said jaws to move toward each other, spring means which tend to move said handle portions away from each other, and means for locking said holder members relative to each other, said means comprising a toothed element movable with one of said holder members, a locking element movable with the other of said holder members which is adapted to engage the teeth of said toothed element, and a long arm located between said handle portions for disconnecting the teeth of said toothed element and said locking element when it is desired to unlock the locked holder members.

ARTHUR J. FAUSEK.
IRWING F. FAUSEK.